United States Patent
Kamiwada et al.

(10) Patent No.: US 6,877,135 B1
(45) Date of Patent: Apr. 5, 2005

(54) DOCUMENT DISPLAY APPARATUS AND METHOD FOR DISPLAYING DOCUMENTS

(75) Inventors: Toru Kamiwada, Kawasaki (JP); Takushi Fujita, Kawasaki (JP)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/473,049

(22) Filed: Dec. 28, 1999

(30) Foreign Application Priority Data

Jan. 8, 1999 (JP) .......................................... 11-003033

(51) Int. Cl.[7] .............................................. G06F 3/00
(52) U.S. Cl. .............................. 715/501.1; 715/500.1; 715/513; 707/3; 345/788
(58) Field of Search ................................ 345/788, 790; 715/513, 500.1

(56) References Cited

U.S. PATENT DOCUMENTS

| | | | | |
|---|---|---|---|---|
| 6,012,053 A | * | 1/2000 | Pant et al. ...................... 707/3 |
| 6,021,435 A | * | 2/2000 | Nielsen ...................... 709/224 |
| 6,034,689 A | * | 3/2000 | White et al. ................. 345/854 |
| 6,070,176 A | * | 5/2000 | Downs et al. ............... 715/513 |
| 6,088,032 A | * | 7/2000 | Mackinlay ................... 345/848 |
| 6,389,437 B2 | * | 5/2002 | Stoub ......................... 715/523 |
| 6,562,076 B2 | * | 5/2003 | Edwards et al. ............ 715/515 |
| 6,650,343 B1 | * | 11/2003 | Fujita et al. ................. 345/760 |

FOREIGN PATENT DOCUMENTS

| | | |
|---|---|---|
| JP | 62-284461 | 12/1987 |
| JP | 8-115338 | 5/1996 |
| JP | 9-185607 | 7/1997 |

* cited by examiner

*Primary Examiner*—Stephen S. Hong
*Assistant Examiner*—Matthew Ludwig
(74) *Attorney, Agent, or Firm*—Staas & Halsey LLP

(57) ABSTRACT

A document display apparatus analyzes document data of electronic documents that are scanning targets (Step S11), calculates a display priority p (Step S12), registers it as priority level information if it is greater than or equal to first set value P1 (Step S14), further scans the document structure of those electronic documents if they have link destination documents (Step S17), and releases storage region of document management information if display priority p is smaller than second set value P2 (Step 20) in order to better manage finite computer system resources.

18 Claims, 11 Drawing Sheets

- ● ORIGIN DOCUMENT
- ◧ DISPLAY TARGET DOCUMENT
- ⊜ SCANNING TARGET DOCUMENT
- ○ SCANNING TARGET EXCEPTION DOCUMENT

DOCUMENT DISPLAY APPARATUS AND METHOD FOR DISPLAYING DOCUMENTS

BACKGROUND OF THE INVENTION

A. Field of the Invention

The present invention relates to a document display apparatus and a document display method, and more particularly relates to a document display apparatus and a document display method configured to display a plurality of groups of electronic documents that include text data, picture data and/or motion picture data, that are stored on electronic medium, each electronic document or group of documents having a specific structure or form.

B. Description of the Related Art

When a plurality of electronic documents, such as text data, picture data and motion picture data, is managed and then displayed on a monitor in an information processing apparatus, such as a personal computer, the document group structure of each electronic document is managed and each electronic document is displayed based on this document group structure.

An example of a document group structure is a hyperlink structure based on hypertext wherein a link to another electronic document is embedded in an electronic document. In this hyperlink structure, each electronic document holds structure information that defines the relative relevance to linked documents having display relevance, document group structure is constructed based on this structure information, and documents are displayed in accordance with this document group structure.

In addition, there are also systems wherein the directory structure of a file system is defines the document group structure of a document group stored in that file system, and documents are displayed in accordance with the document group structure.

When browsing a plurality of electronic documents stored on an electronic medium, conventional document browsing programs display the contents of each electronic document on the display screen of the monitor based on an instruction input by the user or based on stored priorities. In this case, in a program having a function that simultaneously displays on the monitor the document group structure that includes a plurality of electronic documents, the document group structure is stored in a self-managed storage region, and this information is used when displaying the electronic documents.

If there has been a display-related instruction transmitted from an input means like a keyboard or mouse, the document group structure being managed is scanned, the need to display each electronic document is determined, and the contents of documents that need to be displayed are displayed in the display region.

Problems that the Invention is to Solve:

With such a document browsing program, in order to determine whether to display each electronic document stored in the electronic medium, it is necessary to scan all document group structures being managed and to determined whether to display of each electronic documents.

Accordingly, when the number of electronic documents being managed is enormous, a large storage region is required for managing the document group structures, and a prolonged calculation time is required for scanning the document group structures.

For example, in a window system like X Window and Microsoft Windows, a management program holds information on all windows managed, scans the document group structure of each window thereby forming a tree structure when drawing the screen, and issues drawing commands. The size of the structure that can be simultaneously managed by this program is limited to by the amount of computer resources needed by all windows. The computer resources needed to manage the structure cannot exceed available computer resources.

In addition, with a hyperlink structure based on hypertext, some document group structures are not finite and it may not be possible for a computer system to manage the entire document group structure.

SUMMARY OF THE INVENTION

One object of the present invention is to provide a document display apparatus and a document display method that facilitate management of displayed documents with finite computer resources in cases where the number of electronic documents to be managed is enormous and a displayed document group has infinite structure information such as a hyperlink structure, where the response to display instructions is more rapid that prior art configurations.

The document display apparatus according to the present invention is a document display apparatus that manages a plurality of electronic documents that each hold, when a linked document having display relevancy exists, the relative relevancy to that linked document as structure information, determines the display priority of each electronic document, and displays each electronic document based on its display priority, provided with a structure storage means, a structure analysis means and a display means. The structure storage means can store the display priority of each electronic document. The structure analysis means determines the display priority of each of the plurality of electronic documents based on the structure information held by each of the plurality of electronic documents, and stores them in the structure storage means. The display means determines the display method of each electronic document based on the display priority determined by the structure analysis means.

Furthermore, there may preferably be an instruction reception means that receives a display-related instruction input, wherein based on the instruction input received by the instruction reception means, the display priority of each of the plurality of electronic documents is recalculated by the structure analysis means and is stored in the structure storage means.

In addition, from among the plurality of electronic documents, only those whose display priority is a value larger than a predetermined display set value are displayed and other electronic documents are not displayed.

Furthermore, the display means allocates computer resources for displaying electronic documents from among the plurality of electronic documents are managed in order of largest display priority value such that each electronic document whose display priority value is smaller than that of the electronic document allocated computer resources at the point in time when the available computer resources became exhausted shall not be displayed.

In addition, the display means allocates computer resources to those electronic documents whose display priority is of a value larger than the display set value, in order of largest display priority value. However, each electronic document whose display priority value is smaller than that of the electronic document allocated computer resources at the point in time when the available computer resources became exhausted is not displayed.

Furthermore, the structure analysis means scans the linked document based on the structure information held by each electronic document, analyzes the document group structure and stores it in the structure storage means.

In addition, the structure analysis means does not scan linked documents of electronic documents whose display priority is a value smaller than a predetermined first set value.

Furthermore, the structure analysis means excludes electronic documents whose display priority is a value smaller than a predetermined second set value from the management target of the document group structure stored in the structure storage means, and releases computer resources needed for the management of those documents.

In accordance with another aspect of the present invention, there is a document display method for managing a plurality of electronic documents that each includes structure information relating to a linked document having display relevancy, the document display method for determining the display priority of each electronic document, and for displaying each electronic document on a display apparatus based on its display priority, including the steps of:

determining a starting point document to be used as a starting point when analyzing the structure information of the plurality of electronic documents;

analyzing the structure information of the starting point document and calculate the display priority of each the linked document group whose link source is included in the starting point document;

specifying a display document to be displayed on the display apparatus based on the display priority of the linked document group;

specifying the document group constituent documents that constitute the document group structure, add and store that structure information in the document group structure based on the display priority of the linked document group whose link source is the starting point document; and searching for the electronic document that constitutes a next starting point document based on the document group structure, wherein the above steps are repeated, and scanning for displaying is terminated at the point in time when there are no longer any electronic documents that constitute the starting point document determined by the determining of a start point step.

In addition, in said step of determining a start point, the origin document with highest priority is specified as the first starting point document based on instruction input.

In addition, in the step of specifying a display document the display priority value of each electronic document of a linked document group linked to said starting point document is compared to a predetermined display set value such that all of these electronic documents having a display priority value greater than or equal to the predetermined display set value are set to be displayed on the display apparatus, and those electronic documents having a display priority value less that the predetermined display set value are not displayed on the display apparatus.

In addition, in the step of specifying a display document, computer resources are allocated for displaying determined electronic documents of the linked document group whose link source is the starting point document, and whose display priority value is greater than or equal to said display set value, and each electronic document whose display priority value is smaller than that of the display priority value is not displayed on the display apparatus.

In addition, in the step of specifying the document group constituent documents the structure information of electronic documents of the linked document group whose link source is the starting point document having a display priority value is smaller than the predetermined first set value are not analyzed.

In addition, in the step of specifying the document group constituent documents, computer resources needed for managing electronic documents of the linked document group whose link source is the starting point document having a display priority value that is smaller than a predetermined second set value are released.

For example, a display priority attribute is provided for each electronic document. The display priority is calculated based on the position at which that electronic document is to be displayed, the area to be displayed, the amount of calculations required for the display, the display contents and the like. The elements required for these calculations vary in accordance with the usage conditions of the computer, and the display priority also varies accordingly. The higher the display priority value of an electronic document, the more computer resources needed for displaying must be allocated.

The electronic document among all electronic documents having the largest display priority value is set as the origin document, and the document group structure is scanned by analyzing the structure information in order from this origin document. In this scanning, electronic documents whose display priority value is greater than or equal to a predetermined display set value are set so that they will be displayed, and electronic documents whose display priority value is smaller than the display set value are only scanned for their document group structure as display target exceptions.

Whether to scan a linked document based on the structure information of each electronic document is also judged based on the display priority. Electronic documents whose display priority value is greater than or equal to a predetermined first set value are regarded as electronic documents wherein linked documents are scanned based on the structure information of the electronic documents, and electronic documents whose display priority value is smaller than the first set value are regarded as electronic documents wherein linked documents are not scanned based on the structure information. The first set value is set to a value smaller than the display set value.

Electronic documents targeted for display by the scanning discussed above are allocated computer resources in order of largest display priority value, and even electronic documents targeted for display at the point in time when allocatable computer resources became exhausted are not actually displayed.

Furthermore, electronic documents whose display priority value is smaller than the second set value are excluded from the management target, and computer resources like the storage region needed for management are also released. The second set value is set to a value smaller than the first set value.

By adopting such a constitution, a partial structure in a fixed range in accordance with available computer resources can be made the management target and the number of documents to be actually displayed can be appropriately limited, even in cases such as when the number of documents in the electronic document group to be managed is enormous or when the document group structure is infinite. In addition, the partial document group structure to be managed can be varied appropriately according to the usage conditions of the program, and the structure of the document group that is the display target is not subject to limits on computer resources. Furthermore, since computer resources not occupied by electronic documents that need not be displayed are appropriately released, it is possible to limit the overall required computer resources.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE INVENTION

The following explains a computer software program that displays hypertext in accordance one embodiment of the present invention.

Figure 1:
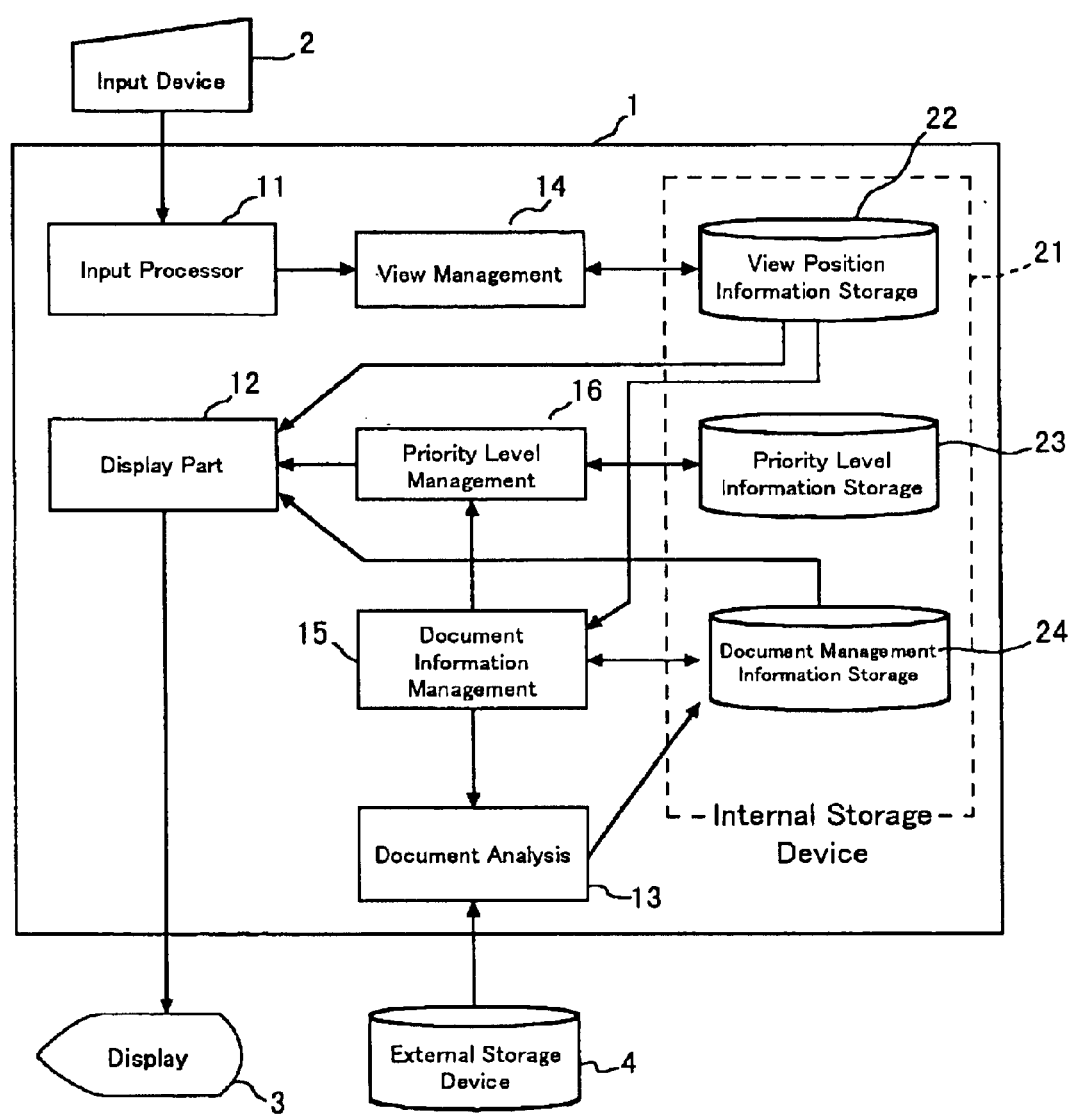
FIG. 1 is a functional block diagram showing portions of a computer system in accordance with one embodiment of the present invention.

FIG. 1 is a functional block diagram showing various elements of a document display apparatus employed in one embodiment for carrying out the present invention.

The document display apparatus includes a computer system 1 that is provided with a CPU, ROM, RAM, various interfaces and the like (not specifically depicted), an input apparatus 2, such as a keyboard or mouse, display device 3, such as a CRT display or liquid crystal display apparatus, external storage medium 4, wherein the contents of an electronic document group are stored, and the like are connected. External storage medium 4 is, for example, a disc drive having a large-capacity storage medium such as a hard disk, optical disks or DVD, or a storage medium of a host computer connected by the Internet, an Intranet or the like, via a respectively supported interface, modem, terminal adaptor (TA) or the like, to the computer system 1.

The computer system 1 includes: input processing module 11 that receives instructions input from input apparatus 2; a display module 12 for constructing images that are displayed on the display screen of the display device 3 and for outputting the images to display device 3; a document analysis module 13 for reading electronic documents stored in external storage medium 4 and for analyzing the document information thereof; and an internal storage apparatus 21 for storing various data.

The internal storage apparatus 21 is provided with: a view position information storage portion 22 that stores the view information related to the electronic document to be displayed on display device 3; a priority level information storage portion 23 that stores display priority data of the electronic document to be displayed on display device 3; and a document management information storage portion 24 that stores the structure information of the electronic document analyzed by document analysis module 13.

The view information management module 14 is connected to input processing module 11. In addition to reading and managing the view position information stored in view position information storage portion 22 of internal storage apparatus 21, the view information management module 14 also extracts the instruction information related to the view position on display device 3 from among the instruction inputs received when there have been instruction inputs from input apparatus 2, and the view information management module 14 updates the view position information and stores that information in view position information storage portion 22.

The document analysis module 13 reads an electronic document stored in external storage medium 4, analyzes the document information thereof, extracts the structure information, such as the position information whose link source is another electronic document and the position information of another electronic document that is a link destination, and stores that information as document management information in document management information storage portion 24 of internal storage apparatus 21.

In addition, computer system 1 is provided with a document information management module 15. The document information management module 15 reads the document management information stored in document management information storage portion 24 of internal storage apparatus 21, updates the document management information based on the view position information stored in view position information storage portion 22, stores that information again in document management information storage portion 24, and sends the document management information to document analysis module 13 and priority level management module 16.

Priority level management module 16 reads the priority level information stored in priority level information storage portion 23 of internal storage apparatus 21, updates the priority level information based on the document management information managed by document information management module 15, updates the priority level information stored in priority level information storage portion 23, and sends that priority level information to display module 12.

Display module 12 displays each electronic document on display device 3 based on the view position information stored in view position information storage portion 22, the document management information stored in document management information storage portion 24, and the priority level information managed by priority level management module 16.

Figure 2A:
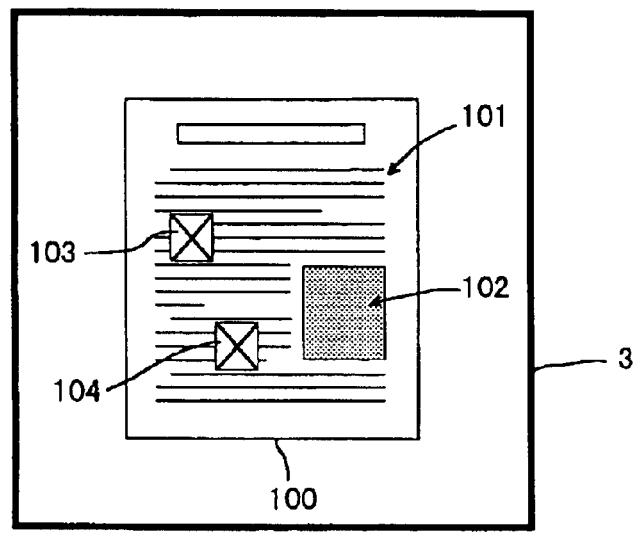
FIGS. 2A, 2B and 2C are explanatory views showing examples of images on a display screen of the computer system depicted in FIG. 1.
Figure 2B:
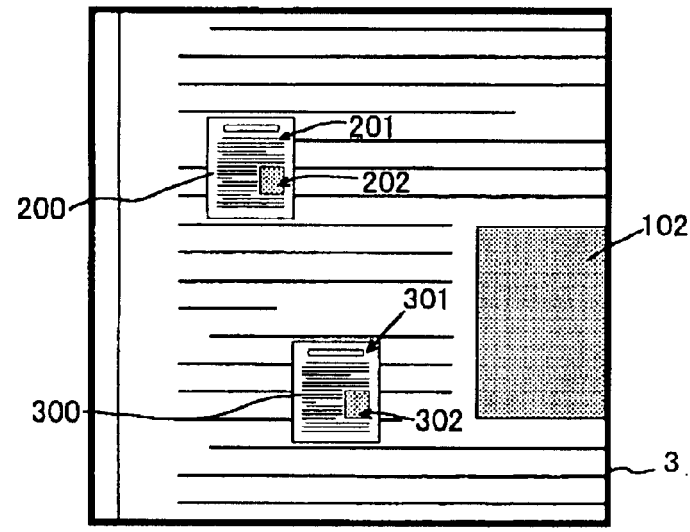
Figure 2C:
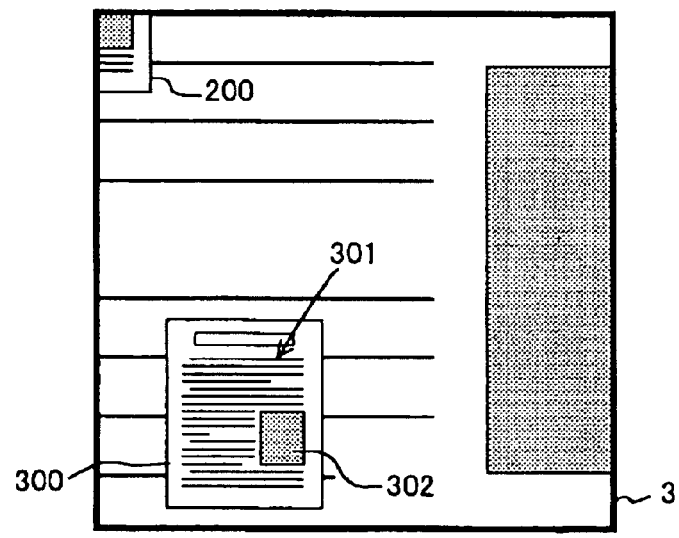

The electronic documents stored in external storage medium 4 include text data, picture or image data, motion picture data and the like. FIGS. 2A, 2B and 2C show examples of such electronic documents displayed on the display device 3.

In FIG. 2A, first electronic document 100 is displayed in the center of display screen 31 of display device 3. First electronic document 100 includes text display portion 101, image data display portion 102, first link part 103 and second link part 104, wherein hyperlinks are embedded. First link part 103 and second link part 104, as linked documents, respectively correspond to second electronic document 200 and third electronic document 300.

FIG. 2B is the display screen of display device 3 wherein part of first electronic document 100, shown in FIG. 2A, is enlarged. Therein, first link part 103 and second link part 104 are enlarged in the center. Second electronic document 200 and third electronic document 300 displayed in first link part 103 and second link part 104 can each be provided with a hyperlink structure, and the display contents, including the hyperlink part, are displayed enlarged corresponding to the enlargement of first electronic document 100. Furthermore, second electronic document 200 is provided with text display portion 201 and third link part 202 wherein a hyperlink is embedded, and third electronic document 300 is provided with text display portion 301 and fourth link part 302 wherein a hyperlink is embedded. A corresponding electronic document applies to third link part 202 and fourth link part 302, respectively, and the contents of electronic documents corresponding to these link parts can be displayed by further enlarging the display.

If the first electronic document in the center of second link part 104 is further enlarged, it appears as shown in FIG. 2C. Furthermore, third electronic document 300 displayed in second link part 104 is enlarged to an extent so that the contents thereof can be read on the screen, and fourth link part 302, wherein a hyperlink is embedded, can be manipulated on the screen. It should be understood that the enlarging process above may be any of a variety of enlarging processes, including a zooming process as set forth in co-pending U.S. patent application Ser. No. 09/407,376, which is incorporated herein by reference in its entirety.

Figure 3:
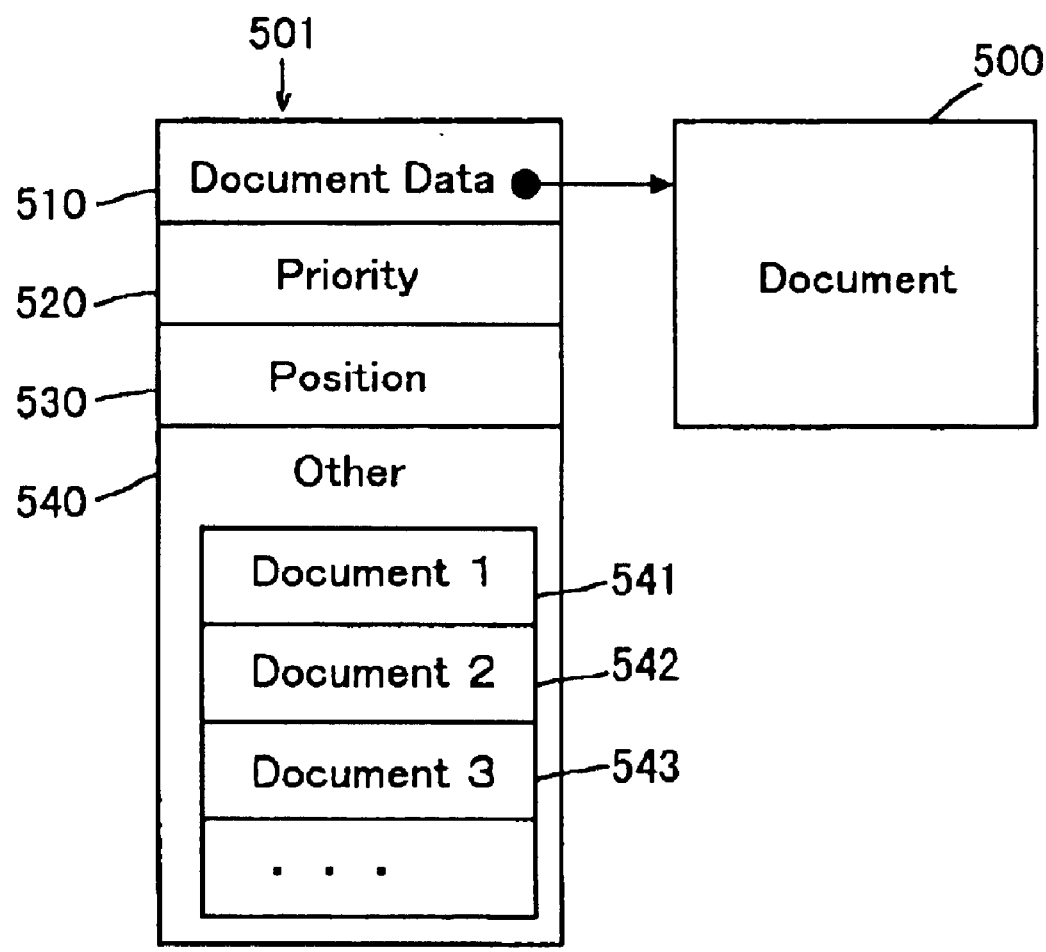
FIG. 3 is a conceptual diagram showing document management information.

In order to display images on the display device 3, the computer system 1 creates and manages document management information 501, as shown in FIG. 3, for each electronic document displayed on the display apparatus. The document management information 501 corresponds to an electronic document 500 displayed on display device 3. Document management information 501 includes document data 510 as a pointer that points to the actual electronic document 500 read into main storage.

In addition, other document information 540 is included in document management information 501. The other document information 540 includes pointers 541, 542, 543 . . . that each correspond to document management information of the link destination electronic documents corresponding to the hyperlinks included in electronic document 500.

In addition, document management information 501 includes position information 530 that indicates at what position electronic document 500 exists in the link source document. Position information 530 indicates the relative position based on the link source document, and is defined by the center coordinates (x, y) of the link destination document, with the center of the link source document as the origin, and size ratio m with respect to the link source document.

Furthermore, document management information 501 includes display priority 520 that indicates the priority used when displaying.

Figure 4:
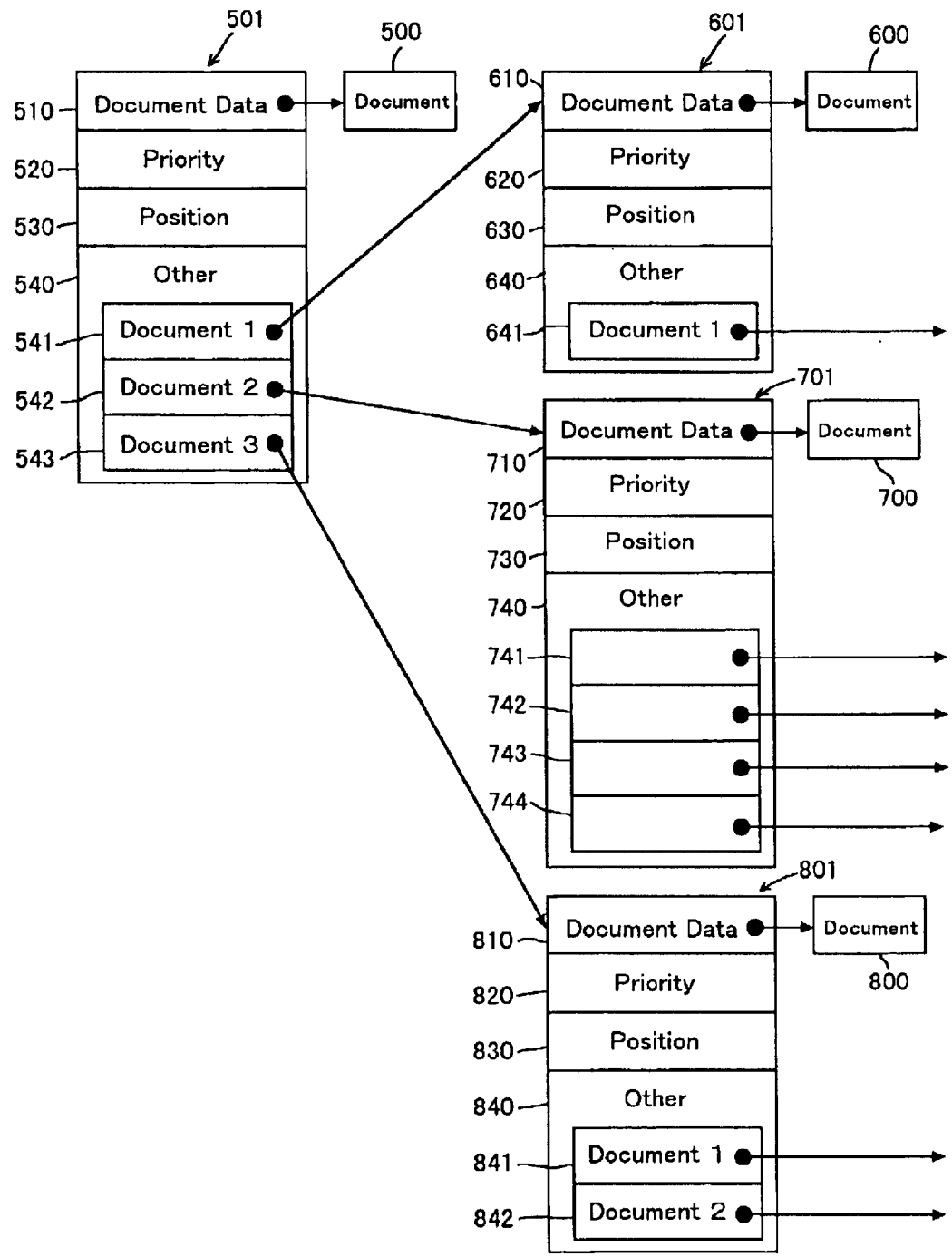
FIG. 4 is a conceptual diagram showing document group structure of the document management information depicted in FIG. 3.

FIG. 4 shows one example of the document group structure for the case wherein electronic document 500 is displayed as the origin document. Document management information 501 of electronic document 500 includes other document information 540, and other document information 540 includes three link destination documents pointers 541, 542, 543.

Computer system 1 scans and manages document management information 601, 701, 801 for electronic documents 600, 700, 800 corresponding to pointers 541, 542, 543. It should be understood that the electronic document 500 is the link source document for the electronic documents 600, 700 and 800.

Document management information 601 of electronic document 600 includes document data 610 as a pointer that points to electronic document 600 that was read into main storage, display priority 620 that indicates the priority used when displaying electronic document 600, position information 630 that indicates the relative position in the link source document (in this case, electronic document 500), and other document information 640 that is a link destination document pointer. In the example shown in FIG. 4, other document information 640 includes link destination document pointer 641.

In addition, document management information 701 of electronic document 700 likewise includes document data 710 as a pointer that points to electronic document 700 that was read into main storage, display priority 720 that indicates the priority used when displaying electronic document 700, position information 730 that indicates the relative position in the link source document (in this case, electronic document 500), and other document information 740 that is a link destination document pointer. In the example shown in FIG. 4, other document information 740 includes link destination document pointers 741, 742, 743, 744.

Furthermore, document management information 801 of electronic document 800 includes document data 810 as a pointer that points to electronic document 800 that was read into main storage, display priority 820 that indicates the priority used when displaying electronic document 800, position information 830 that indicates the relative position in the link source document (in this case, electronic document 500), and other document information 840 that is a link destination document pointer. In the example shown in FIG. 4, other document information 840 includes link destination document pointers 841, 842.

The following explains the operation performed when displaying each electronic document managed, based on the drawings.

Figure 5:
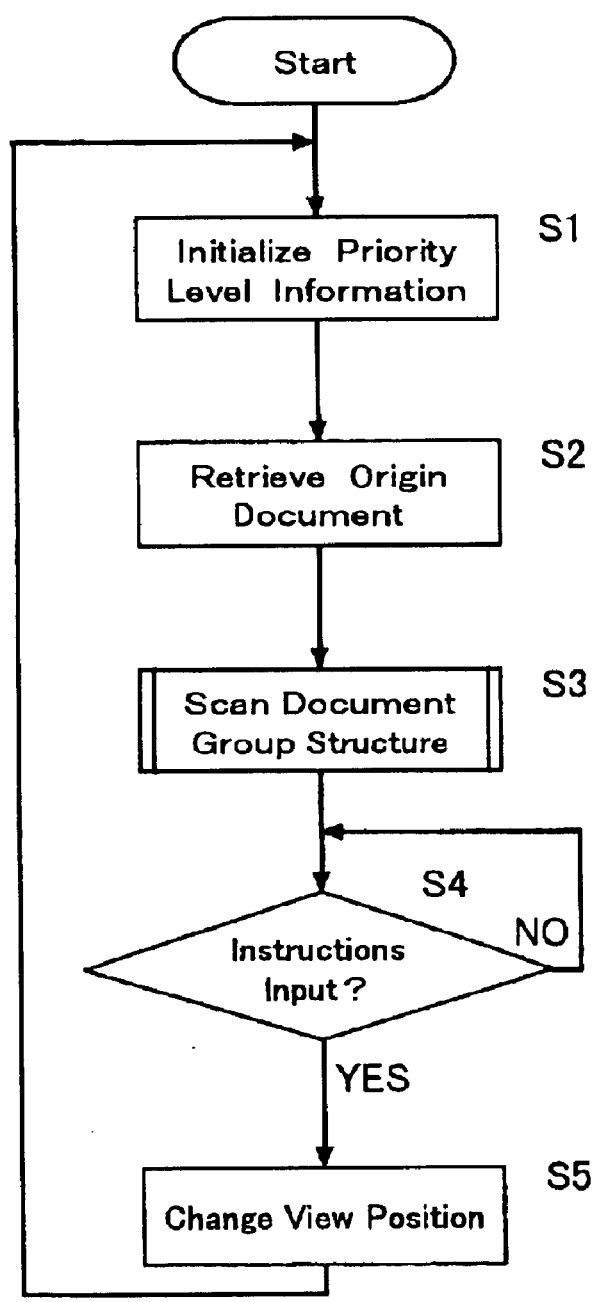
FIG. 5 is a control flowchart showing operational steps in accordance with the present invention.

When the program in accordance with the present invention is activated in, for instance, a personal computer, the priority level information is initialized in Step S1 in FIG. 5. Furthermore, the priority level information of internal storage apparatus 21 is updated based on the document management information managed by document information management module 15. If instructions have been input by the user via input apparatus 2 at this time, the priority level information is updated based on this instruction input; if no instruction has been input, the priority level information is updated based on the default value and the like, or the value of priority level information storage portion 23 is maintained unaltered.

In Step S2, an origin document (or base document) to be displayed having a highest priority level is identified based on the priority level information stored in priority level information storage portion 23 of the internal storage apparatus 21, and the document management information of the origin document is retrieved from document management information storage portion 24.

In Step S3, the document group structure is scanned, with the origin document specified in Step S2 as the first scan target, by tracing the document management information.

In step S4, a determination is made whether or not instructions have been input by the user from input apparatus 2 thereby changing the display status of the electronic document displayed on display device 3. If an instruction was input, processing transitions to Step S5. In Step S5, the view position information stored in view position information storage portion 22 of internal storage apparatus 21 based on the instruction input from the user is updated. Subsequently, processing transitions to Step S1.

The process of scanning the document group structure in Step S3 is described below with reference to FIG. 6.

Figure 7:
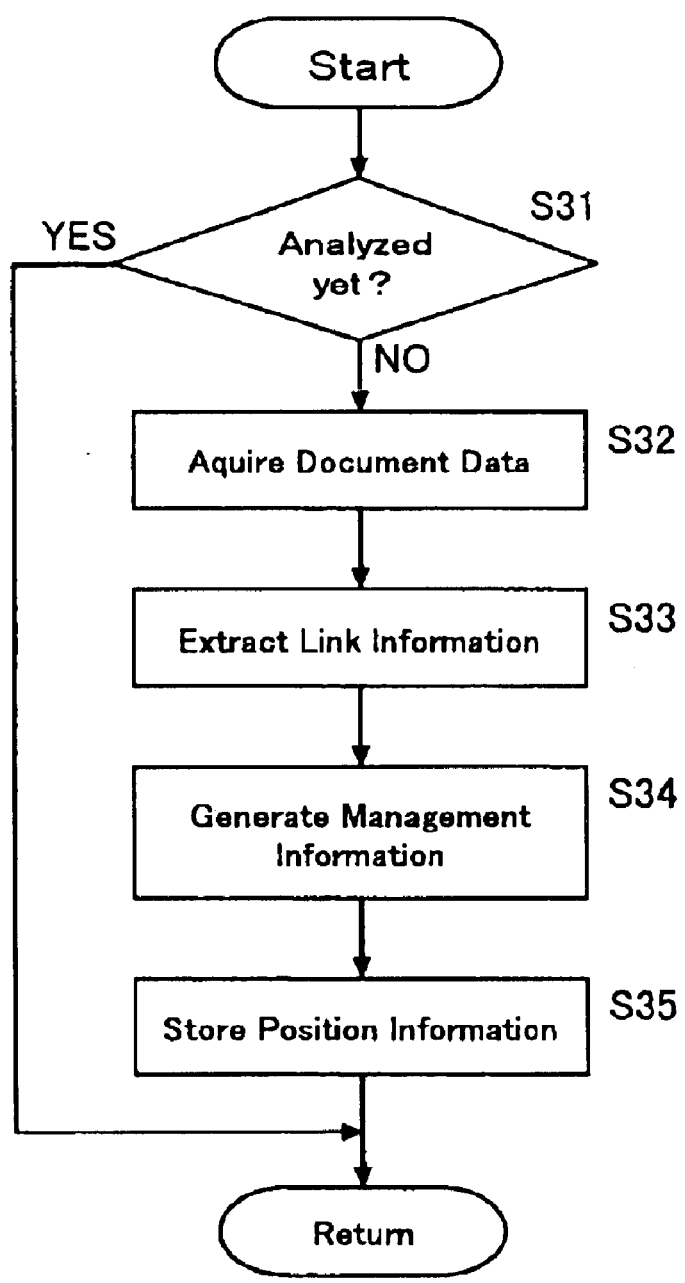
FIG. 7 is another control flowchart showing steps of document analysis processing.

In Step S11, document analysis processing is performed on the electronic documents that are the scanning targets to subsequently be displayed. FIG. 7 shows the document analysis processing in Step S11.

As shown in FIG. 7, at step S31 a determination is made whether or not the electronic document that is the current scanning target was previously analyzed. If it is determined that the electronic document was previously analyzed, analysis processing of that document is terminated. If it is determined that the electronic document that is currently the scanning target has not been analyzed, processing transitions to Step S32. In Step S32, the document data of the electronic document that is currently the scanning target is acquired from the electronic document group stored in external storage medium 4.

In Step S33, the link information in the document data is extracted. If links exist in the actual electronic document, the pointers to the link destination documents are successively added in Step S34 as other document information 540 (refer to FIG. 3) in document management information 501.

In Step S34, the position information of the electronic document is generated, and the position information is stored in document management information 501 as position information 530 (see FIGS. 3 and 4) at step S35. If the position information for the electronic document is not stored in the document management information, the information is obtained from the link source document and the position information is determined. In addition, if the electronic document is the origin document determined at the time of activation, the coordinates (0, 0) and zoom ratio m=1 relative to the computer monitor display) are stored as the predetermined position information, since no link source document exists. Furthermore, the created document management information 501 is stored in document management information storage portion 24 of internal storage apparatus 21 in step S35. Subsequently, processing returns to Step S12 in FIG. 6.

In step S12 display priority p of the electronic document that is the scanning target is calculated. Furthermore, document information management module 15 reads position information 530 stored in document management information storage portion 24 and the view position information stored in view position information storage portion 22, and sends that information to priority level management module 16. Priority level management module 16 converts position information 530, which is the relative positional relationship with the link source document, to a coordinate system the same as the origin document based on the view position information, and determines display priority p of the currently scanned electronic document. Display priority p is stored in document management information storage portion 24 as display priority 520 in document management information 501 for the corresponding electronic document.

In step S13 it is determined whether or not display priority p is greater than or equal to a first set value P1. If display priority p is greater than or equal to the first set value P1, processing transitions to Step S14. Step S14 sets the display presets for the electronic documents to be displayed, compares the priority level with those of other electronic documents to be displayed and registers the priority level information.

Figure 8:
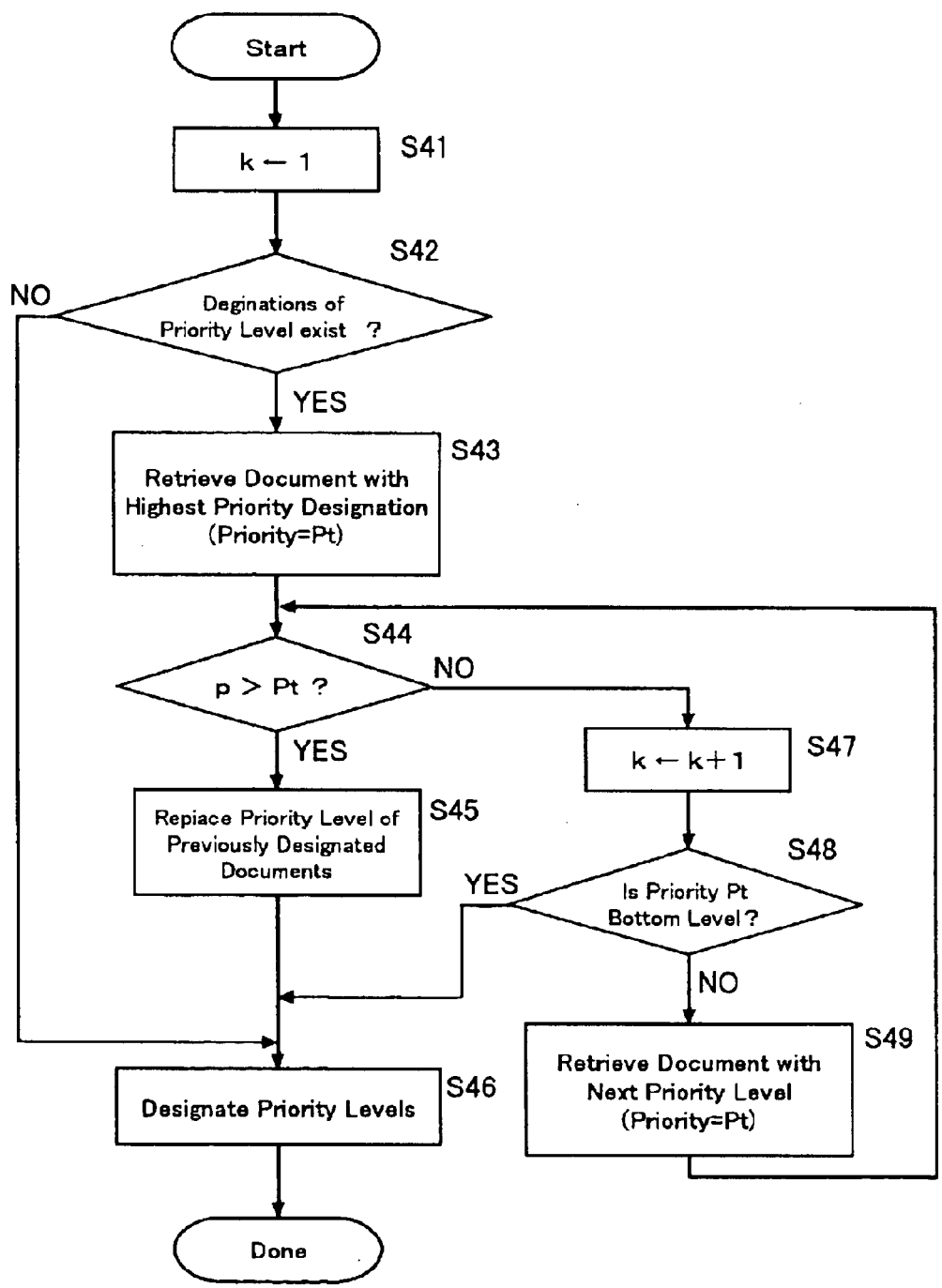
FIG. 8 is still another control flowchart showing steps of registration processing of priority level of document group structure.

FIG. 8 shows the registration processing for the priority level information in Step S14.

As shown in FIG. 8, at step S41 priority level k of the electronic document that is the scanning target is initialized. At step S42 a determination is made whether or not there are designations of priority levels in priority level information storage portion 23 in internal storage apparatus 21. Furthermore, if there are-no priority level designations, processing transitions to Step S46. Step S46 designates priority level k of the electronic document in the priority level information, and terminates the process. The priority level of the electronic document is "1" at this time, and constitutes the top level of the priority level information. If it is determined in Step S42 that there is a designation of a priority level, processing transitions to Step S43.

Step S43 reads from priority level information storage portion 23 the display priority of the electronic document whose priority level is the top or highest level, and sets it to Pt (priority=Pt). Step S44 compares display priority p of the electronic document that is the current scanning target with display priority Pt of the previously registered electronic documents. If display priority p of the electronic document that is the current scanning target is larger than display priority Pt of the previously registered electronic documents, processing transitions to Step S45.

Step S45 reduces, one at a time, the priority level of all electronic documents that have a priority level that is greater than display priority Pt. Subsequently, processing transitions to Step S46, the priority level of the electronic document that is the current scanning target is designated (and recorded), and processing terminates and returns to FIG. 6 step S14.

If it is determined in Step S44 that display priority p of the electronic document that is the current scanning target is less than display priority Pt of the previously registered electronic documents, processing transitions to Step S47. Step S47 increments upward priority level k of the electronic document that is the current scanning target. In step S48 a determination is made whether or not the previously registered electronic document whose display priority was designated as Pt is the bottom level of the designated priority level information. If it is determined to be the bottom level, processing transitions to Step S46, the priority level of the electronic document that is the current scanning target is registered, and processing is terminated and returns to step S14 in FIG. 6.

If it is determined in Step S48 that the previously registered document whose current display priority was designated as Pt is not the bottom level of the registered priority level information, processing transitions to Step S49. Step S49 reads from the priority level information registered in priority level information storage portion 23 the display priority for the electronic document of the next priority level, and designates its display priority to Pt. Subsequently, processing transitions to Step S44, and a portion of the process is executed again.

At this point in time, provisional priority level information of that electronic document is designated in priority level information storage portion 23 of internal storage apparatus 21.

Figure 6:
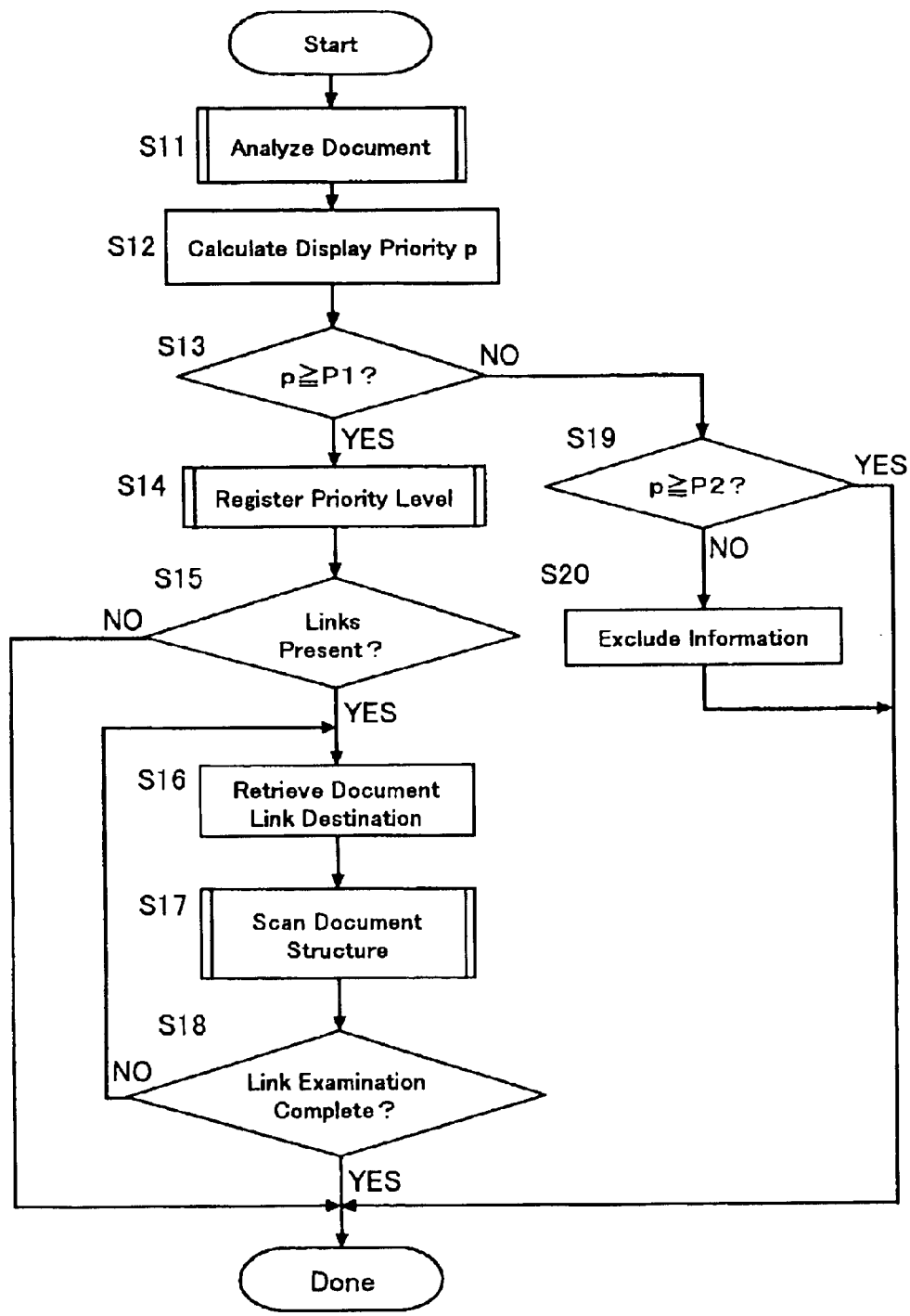
FIG. 6 is another control flowchart showing steps of a scan process for scanning information of document group structure.

If the registration processing of the priority level in Step S14 of FIG. 6 is completed, processing transitions to Step S15. In step S15 a determination is made whether or not any link destination documents exist for the electronic document that is the current scanning target. If it is determined that no link destination documents exist, the process is terminated. In addition, if it is determined that link destination documents exist, processing transitions to Step S16.

In step S16 the document data of the link destination electronic document is read, based on other document information 540 of the electronic document that is the current scanning target. Step S17 executes the scanning process of the document group structure with the read-in link destination electronic document as the current scanning target electronic document.

In step S18 a determination is made whether or not scanning of the document group for all links has completed. If it is determined that scanning of the document group for all links is not completed, processing transitions to step S16, and the process is executed for the next link destination document.

If display priority p is determined to be smaller than first set value P1 in Step S13, processing transitions to Step S19. In step S19 a determination is made as to whether or not display priority p is greater than or equal to a second set value P2. Furthermore, if it is determined that display priority p is smaller than the second set value P2, processing transitions to Step S20. Step S20 excludes from the management target the electronic document that is the current scanning target, and releases the storage region wherein the document management information of that electronic document is stored, thereby freeing computer system resources.

Thus, electronic documents whose display priority p is smaller than second set value P2 are excluded from the management target of the storage region, and only those that are management targets are registered in the priority level information. At this point, the scan process is recursively executed in Step S17 of FIG. 6 for the link destination documents, and a document group structure is constructed based on the display priority levels. As a result, the priority level information is initialized when the entire scan starts, each document information is added, in order of highest display priority, at an appropriate position as the scanning proceeds, which are then arrayed and stored in order of highest display priority.

As described above, when scanning of the document group structure is done, computer resources are allocated in accordance with the registered priority level information. The document management information is retrieved in order from the top level of the priority level information, arrayed as a result of scanning of the document group structure, and computer resources needed to display the electronic document are allocated from available computer resources. When the available computer resources become exhausted, the allocation of computer resources is terminated; furthermore, each electronic document whose display priority value is less than a determined display priority value at that point in time is not displayed.

Further parameters for determining display levels can also utilized. For example, a display set value P0 that is greater than or equal to P1 (P0≧P1) may be utilized and computer resources are not allocated for electronic documents whose display priority p is less than the display set value P0.

Thus, when the allocation of computer resources is completed, electronic documents for which resources have been allocated are displayed on display device 3. If there is an instruction input via input apparatus 2 after displaying, the view position information is updated via view information management module 14 in accordance with that input value. Since the display priority of each electronic document changes based on changes in the view position information, the document group structure is scanned every time the view position information is updated and, based on the priority level information obtained as a result, computer resources are allocated to each electronic document and the screen of display device 3 is updated.

Further, during the scanning process of the document group structure, display priority p of each electronic document is compared with display set value P0, and electronic documents whose display priority p is larger than display set value Pt are preset as display target documents. FIG. 9 and subsequent drawings show the process wherein, by using this type of display preset processing, display target documents, scanning target 1=documents and management target exception documents are set.

FIGS. 9A, 9B, 9C, 9D and 9E, FIGS. 10A, 10B, 10C, 10D and 10E and FIGS. 11A, 11B, 11C, 11D, 11E, 11F and 11B show one example of scanning a document group structure.

Figure 9A:
FIGS. 9A, 9B, 9C, 9D and 9E are diagrams showing an example of the relationships of portions of a scanned document group structure.

In FIG. 9A, the origin document is specified as electronic document A.

Figure 9B:
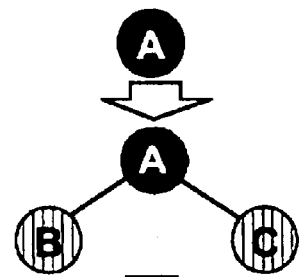

In FIG. 9B, the link destination documents of electronic document A are scanned, the document data of electronic documents B and C are acquired, and their display priorities are examined. The display priorities of the electronic documents B and C are greater than or equal to the display set value P0, so the display level for display target documents are registered and ready for display.

Figure 9C:
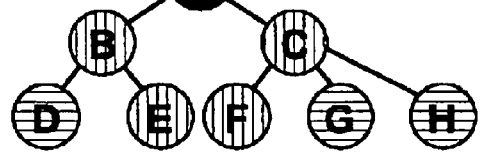

In FIG. 9C, the document data for link destination documents D and E of electronic document B and the link destination documents F, G and H of electronic document C are acquired, and the display priority of each electronic document is examined. Furthermore, since the display priorities for link destination document E of electronic document B and link destination document F of electronic document C are greater than or equal to display set value P0, these are set as display target documents. These display target documents automatically become scanning target documents.

In addition, although the display priorities of link destination document D of electronic document B and link destination documents G and H of electronic document C are smaller than display set value P0, they are set as scanning target documents since their display priorities are smaller than the first set value P1.

Figure 9D:
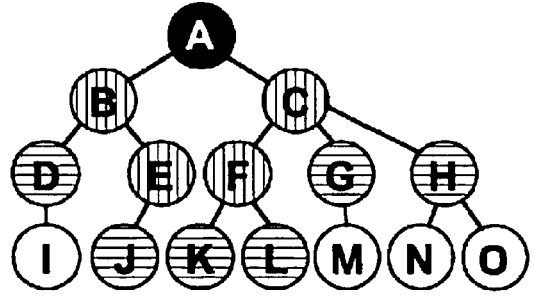

In FIG. 9D, the link destination documents of electronic documents D, E, F, G and H are scanned, and the document data of electronic documents I, J, K, L, M, N and O are acquired. Among these, the display priorities of link destination document J of electronic document E and link destination documents K and L of electronic document F are greater than or equal to first set value P1, and these are set as scanning target documents. In addition, since the display priorities of link destination document I of electronic document D, link destination document M of electronic document G and link destination documents N, 0 of electronic document H are smaller than the first set value, those link destination documents, as scanning target exception documents, are not scanned, and the document management information thereof is only stored in document management information storage portion 24. If the display priorities of electronic documents I, M, N and 0, which are scanning target exceptions, are smaller than second set value P2, these documents are set as management target exception documents, and the storage area of internal storage apparatus 21 wherein the document management information thereof is stored is released. In other words, no system resources are allocated to store further information about electronic documents I, M, N and O.

Figure 9E:
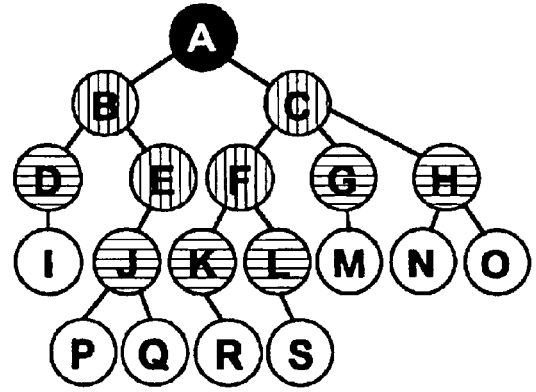

In FIG. 9E, the link destination documents of electronic documents J, K, L are scanned, and the document data of electronic documents P, Q, R, S are obtained. Furthermore, the display priority of each electronic document P, Q, R, S is smaller than first set value P1, and these electronic documents are set as scanning target exception documents. At this stage, there are no longer any scanning target documents, and scanning of the document group structure is terminated.

The following explanation is based on FIGS. 10A, 10B, 10C, 10D and 10E, in an example wherein the view position information is changed by an instruction input from the user, and the origin document is selected to be electronic document C.

Figure 10A:
FIGS. 10A, 10B, 10C, 10D and 10E are diagrams showing more details of the example of the relationships of portions of a scanned document group structure depicted in FIG. 9A.

First, as shown in FIG. 10A, the electronic document C is designated as the origin document.

Figure 10B:
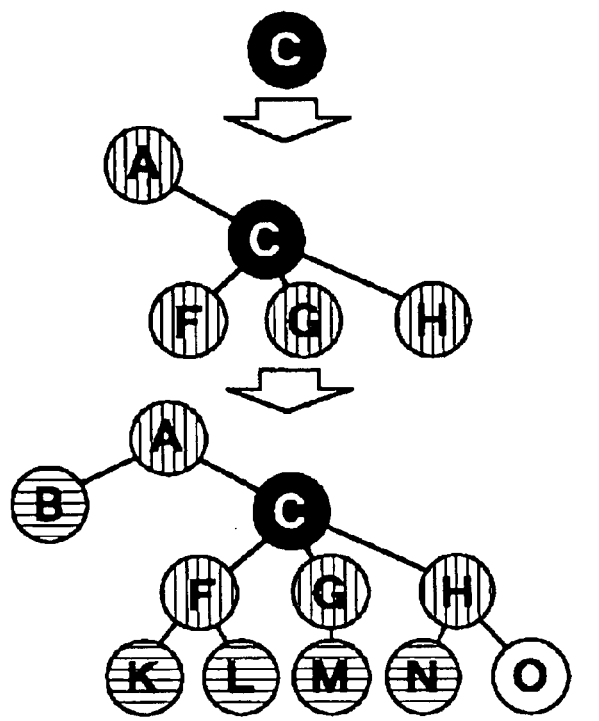

As shown in FIG. 10B, the document data of the link destination documents of electronic document C are acquired, and the display priority of each link destination document F, G, H is examined. At this point, the electronic data of link source electronic document A are simultaneously acquired, and the display priority thereof is examined. Furthermore, the display priority of each electronic document A, F, G, H is greater than or equal to display set value P0, and these electronic documents are set as display target documents.

Figure 10C:
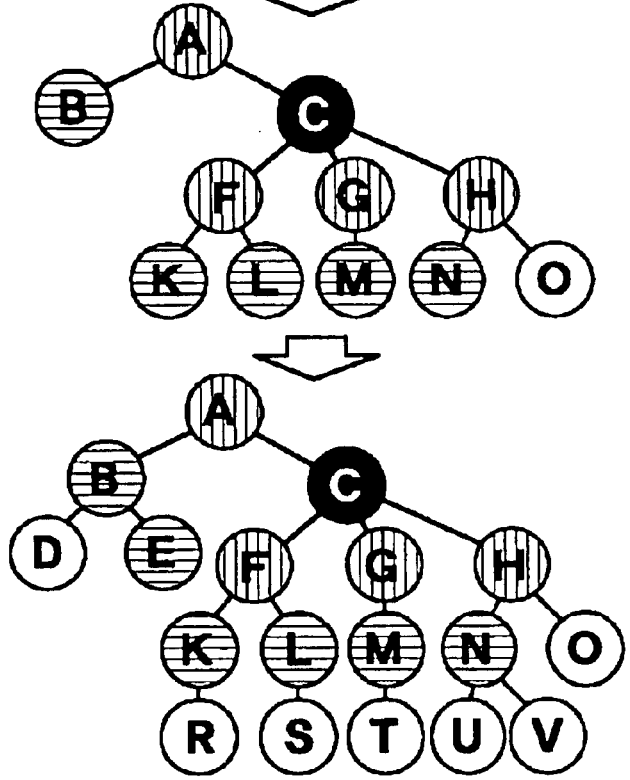

Next, as shown in FIG. 10C, the link destination documents of electronic documents A, F, G and H are scanned, and the document data of electronic documents B, K, L, M and N are acquired. Furthermore, although the display priority of each electronic document B, K, L, M and N is smaller than display set value P0, these electronic documents are set as scanning target documents since their display priorities are greater than first set value P1. In addition, since the display priority of electronic document O, which is the link destination document of electronic document H, is smaller than first set value P1, it is set as a scanning target exception document and no further system resources are allocated for electronic document O.

Figure 10D:
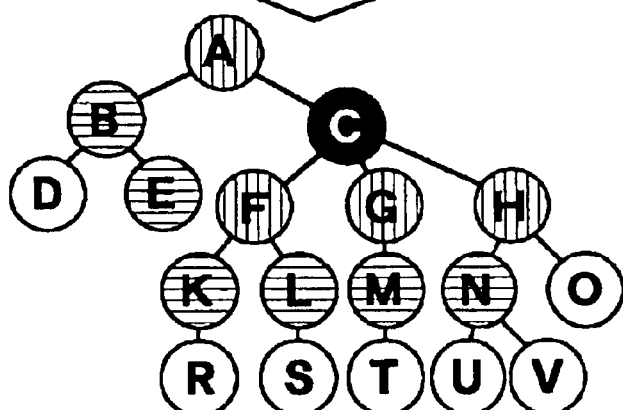

Furthermore, as shown in FIG. 10D, the link destination documents of each electronic document B, K, L, M and N are scanned, and the document data of electronic documents D, E, R, S, T, U and V are acquired. Furthermore, the display priority of electronic document E is greater than first set value P1, and that electronic document is set as a scanning target document; however, since the display priorities of other electronic documents are smaller than the first set value, those electronic documents are set as scanning target exception documents.

Figure 10E:
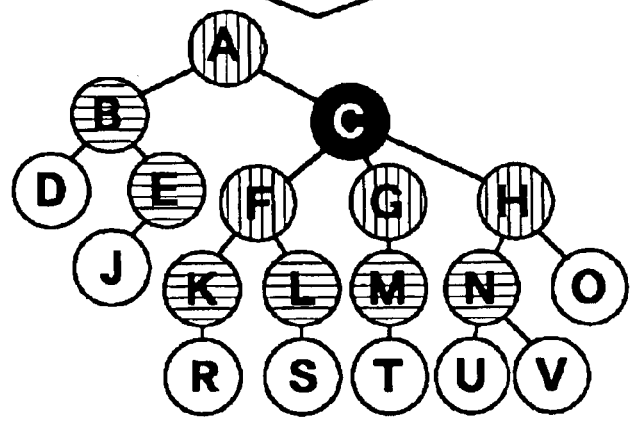

In FIG. 10E, the link destination document of electronic document E is scanned, the document data of electronic document J are acquired, and the display priority thereof is examined. Furthermore, the display priority of electronic document J is smaller than the first set value, and that electronic document is set as a scanning target exception document. At this stage, there are no longer any electronic documents that constitute scanning targets, and scanning of the document group structure is terminated.

In the case of FIGS. 9A, 9B, 9C, 9D and 9E, wherein the origin document is electronic document A, electronic documents D and J are scanning target documents, and electronic documents I, P and Q, which are link destination documents thereof, constitute management target documents; however, by the moving of the origin document to electronic document C as shown in FIGS. 10A, 10B, 10C, 10D and 10E, electronic documents D and J become scanning target exception documents, and electronic documents I, P and Q are excluded from the management target. In addition, in the example shown in FIGS. 9A, 9B, 9C, 9D and 9E, electronic documents M and N were scanning target exceptions; however, in the example shown in FIGS. 10A, 10B, 10C, 10D and 10E, these electronic documents M and N are set as scanning target documents, and electronic documents T, U and V, which are the link destination documents of electronic documents M and N, become management target documents.

Furthermore, FIGS. 11A, 11B, 11C, 11D, 11E, 11F and 11G all show a further example of scanning for the case wherein the origin document has moved to electronic document F.

Figure 11A:
FIGS. 11A, 11B, 11C, 11D, 11E, 11F and 11G are diagrams showing still further details of the example of the relationships of portions of a scanned document group structure depicted in FIGS. 9A and 10A.
Figure 11B:
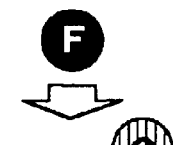
Figure 11C:
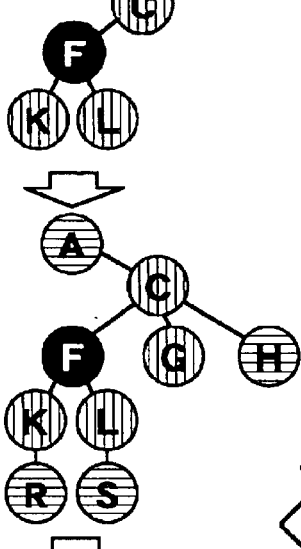
Figure 11D:
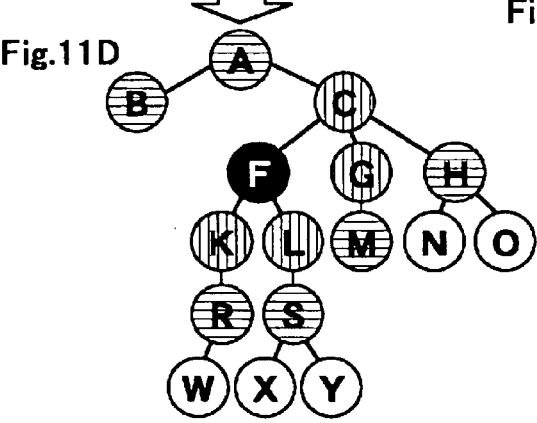
Figure 11E:
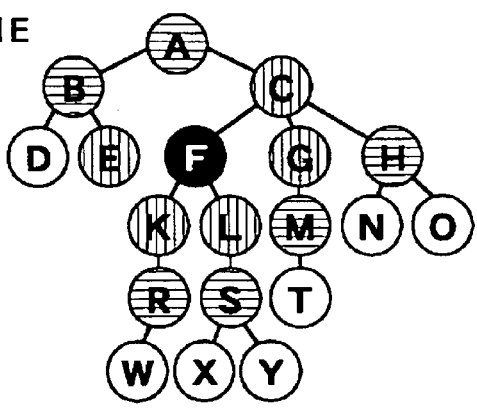

As shown in FIG. 11A, the origin document is specified as electronic document F and, as shown FIG. 11B, the document data of link destination documents K and L and link source document C of electronic document F are scanned. Furthermore, the display priority of each electronic document C, K and L is larger than the display set value, and these electronic documents are set as display target documents.

Furthermore, as shown in FIG. 1C, electronic documents C, K and L are scanned, and the document data of the link destination documents and link source documents are acquired. Furthermore, the display priority of electronic document G is greater than display set value P0, and that electronic document is set as a display target document; in addition, since the display priority of each electronic document A, H, R and S is smaller than display set value P0 and greater than first set value P1, those electronic documents are set as scanning target documents.

As shown in FIG. 1D, electronic documents A, G, H, R and S, which are display target documents and scanning target documents, are scanned, and the document data of link destination documents B, M, N, O, W, X and Y are acquired. Furthermore, link destination document B of electronic document A and link destination document M of electronic document G are set as scanning target documents, and the other electronic documents N, O, W, X and Y are set as scanning target exception documents.

In FIG. 1E, electronic documents B and M are scanned, and the document data of link destination documents D, E and T are acquired. Furthermore, electronic documents D and T are set as scanning target exception documents, and electronic document E is set as a display target document since its display priority is larger than display set value P0.

Figure 11F:
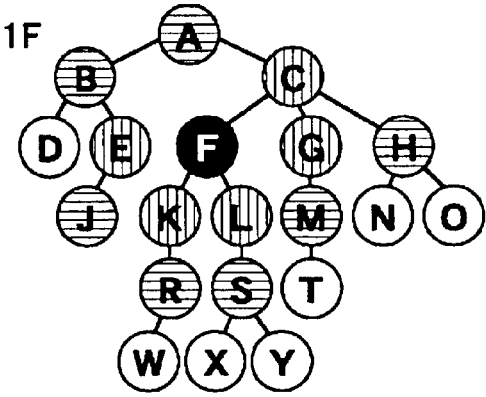

In FIG. 11F, electronic document E is scanned, and link destination document J is set as a scanning target document.

Figure 11G:
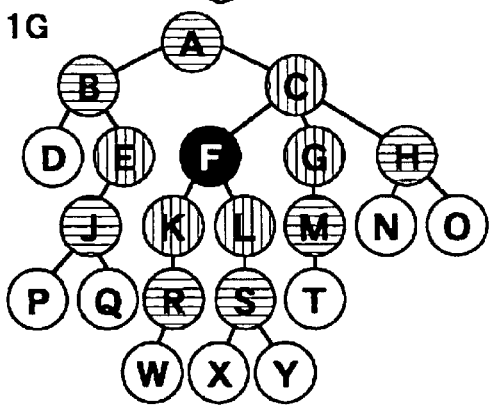

Furthermore, in FIG. 11G, electronic document J is scanned, and link destination documents P and Q are set as scanning target exception documents.

Thus, if the document group structure is scanned by tracing the links from origin document F, electronic document E at a position where the route is long may be set as a display target document due to its display priority. In addition, there is a possibility that the peripheral electronic documents (link destination documents) of such an electronic document may be set as scanning target documents.

EFFECTS OF THE INVENTION

The present invention facilitates management with finite computer resources in cases where the number of electronic documents to be managed is enormous and when displaying a document group having infinite structure information such as a hyperlink structure, and can respond rapidly to display instructions.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A document display apparatus that manages a plurality of electronic documents each holding, when a linked document having hyperlinks exists, a relative relevancy to the linked document, as structure information, determines a display priority of each electronic document, and displays each electronic document based on the display priority thereof, provided with:

structure storage means for storing the display priority of each said electronic document;

structure analysis means for determining the display priority of each of said plurality of electronic documents based on the structure information held by each of said plurality of electronic documents, and stores the display priority thereof in said structure storage means; and display means for determining a display method of each said electronic document based on the display priority determined by said structure analysis means, wherein said structure analysis means scans each linked document based on the structure information held by an origin electronic document, analyzes a document group structure and stores information corresponding to the document group structure in said structure storage means, wherein said structure analysis means does not scan linked documents of electronic documents having a display priority having a value that is smaller than a predetermined first set value, and wherein said structure analysis means excludes electronic documents having a display priority that has a value smaller than a predetermined second set value from a management target of the document group structure stored in said structure storage means, and releases computer resources needed for a management of said excluded electronic documents.

2. The document display apparatus according to claim 1, further having:

instruction reception means for receiving a display-related instruction input, wherein based on the instruction input received by said instruction reception means, the display priority of each of said plurality of electronic documents is recalculated by said structure analysis means and is stored in said structure storage means.

3. The document display apparatus according to claim 2, wherein said display means displays only ones of said plurality of electronic documents having a display priority that is a value larger than a predetermined display set value.

4. The document display apparatus according to claim 3, wherein said display means allocates computer resources to ones of said electronic documents having a display priority value that is larger than said display set value, in order of largest display priority value, and each said electronic document having a display priority value that is smaller than a predetermined value is not displayed.

5. The document display apparatus according to claim 2, wherein said display means allocates computer resources for displaying determined ones of said plurality of electronic documents in order of a largest display priority value, and each said electronic document having a corresponding display priority value that is smaller than a predetermined value is not displayed.

6. The document display apparatus according to claim 1, wherein a layout and a display of the electronic documents are determined based solely on a hyperlink structure.

7. A document display method of managing a plurality of electronic documents each including structure information relating to a linked document, as hyperlinks having display relevancy, the document display method of determining a display priority of each said electronic document, and of displaying each said electronic document on a display apparatus based on a display priority thereof, the method comprising:

determining a starting point document to be used as a starting point when analyzing the structure information of the plurality of electronic documents;

analyzing the structure information of the starting point document to calculate the display priority of each linked document group having a link source that is included in the starting point document;

specifying a display document to be displayed on the display apparatus based on the display priority of the linked document group;

specifying document group constituent documents that constitute a document group structure, adding and storing the structure information in the document group structure based on the display priority of the linked document group having the link source that is the starting point document; and searching for the electronic document that constitutes a next starting point document based on the document group structure, wherein, the analyzing the structure information, the specifying a display document, the specifying a document group and the searching for the electronic document are repeated recursively, and scanning for displaying is terminated at a point in time when there are no longer any electronic documents that constitute the starting point document determined by the determining of the start point operation, wherein, in said determining of the start point, an origin document with a highest priority is specified as a first starting point document based on an instruction input, wherein, in said specifying of the display document a display priority value of each electronic document of the linked document group linked to said starting point document is compared to a predetermined display set value such that all of the electronic documents having corresponding display priority values greater than or equal to the predetermined display set value are set to be displayed on the display apparatus and the electronic documents having the corresponding display priority values less that the predetermined display set value are not displayed on the display apparatus, wherein, in said specifying of the display document computer resources are allocated to display the determined electronic documents of the linked document group having the link source that is the starting point document and having the corresponding display priority values that are greater than or equal to said predetermined display set value and each electronic document having the corresponding display priority value that is smaller than that of the predetermined display priority value is not displayed on the display apparatus, wherein, in said specifying of the document group constituent documents, the structure information of the electronic documents of the linked document group having the link source that is the starting point document and having the corresponding display priority values that are smaller than a predetermined first set value are not analyzed, and wherein, in said specifying of the document group constituent documents, computer resources needed to manage said electronic documents of the linked document group having the link source that is the starting point document and having the corresponding display priority values that are smaller than a predetermined second set value are released.

8. The document display method according to claim 7, wherein managing of the plurality of electronic documents comprises:

determining a layout and a display of the electronic documents based solely on a hyperlink structure.

9. A document display method of managing a plurality of electronic documents each including structure information relating to a linked document, as hyperlinks having display relevancy, the document display method of determining a display priority of each said electronic document, and of displaying each said electronic document on a display apparatus based on a display priority thereof, the method comprising:

determining a starting point document to be used as a starting point when analyzing the structure information of the plurality of electronic documents;

analyzing the structure information of the starting point document to calculate the display priority of each linked document group having a link source that is included in the starting point document;

specifying a display document to be displayed on the display apparatus based on the display priority of the linked document group;

specifying a document group constituent documents that constitute a document group structure, adding and storing the structure information in the document group structure based on the display priority of the linked document group having the link source that is the starting point document; and searching for the electronic document that constitutes a next starting point document based on the document group structure, wherein, the analyzing the structure information, the specifying a display document, the specifying a document group, and the searching for the electronic document are repeated recursively, and scanning for displaying is terminated at a point in time when there are no longer any electronic documents that constitute the starting point document determined by the determining of the start point operation, wherein, in said determining of the start point, an origin document with a highest priority is specified as a first starting point document based on an instruction input, wherein, in said specifying of the display document, a display priority value of each electronic document of the linked document group linked to said starting point document is compared to a predetermined display set value such that all of the electronic documents having corresponding display priority values greater than or equal to the predetermined display set value are set to be displayed on the display apparatus, and the electronic documents having the corresponding display priority values less that the predetermined display set value are not displayed on the display apparatus, wherein, in said specifying of the display document, computer resources are allocated to display the determined electronic documents of the linked document group having the link source that is the starting point document and having the corresponding display priority values that are greater than or equal to said predetermined display set value, and each electronic document having the corresponding display priority value that is smaller than that of the predetermined display priority value is not displayed on the display apparatus, and wherein, in said specifying of the document group constituent documents, the structure information of the electronic documents of the linked document group having the link source that is the starting point document and having the corresponding display priority values that are smaller than a predetermined first set value are not analyzed.

10. A document display method of managing a plurality of electronic documents each including structure information relating to a linked document, as hyperlinks having display relevancy, the document display method of determining a display priority of each said electronic document, and of displaying each said electronic document on a display apparatus based on a display priority thereof, the method comprising:

determining a starting point document to be used as a starting point when analyzing the structure information of the plurality of electronic documents;

analyzing the structure information of the starting point document to calculate the display priority of each linked document group having a link source that is included in the starting point document;

specifying a display document to be displayed on the display apparatus based on the display priority of the linked document group:

specifying document group constituent documents that constitute a document group structure, adding and storing the structure information in the document group structure based on the display priority of the linked document group having the link source that is the starting point document; and searching for the electronic document that constitutes a next starting point document based on the document group structure, wherein, the analyzing the structure information, the specifying a display document, the specifying a document group, and the searching for the electronic document are repeated recursively, and scanning for displaying is terminated at a point in time when there are no longer any electronic documents that constitute the starting point document determined by the determining of the start point operation, wherein, in said determining of the start point, an origin document with a highest priority is specified as a first starting point document based on an instruction input, wherein, in said specifying of the display document, a display priority value of each electronic document of the linked document group linked to said starting point document is compared to a predetermined display set value such that all of the electronic documents having corresponding display priority values greater than or equal to the predetermined display set value are set to be displayed on the display apparatus, and the electronic documents having the corresponding display priority values less that the predetermined display set value are not displayed on the display apparatus, wherein, in said specifying of the display document, computer resources are allocated to display the determined electronic documents of the linked document group having the link source that is the starting point document, and having the corresponding display priority values that are greater than or equal to said predetermined display set value, and each electronic document having the corresponding display priority value that is smaller than that of the predetermined display priority value is not displayed on the display apparatus, and wherein, in said specifying of the document group constituent documents, computer resources needed to manage said electronic documents of the linked document group having the link source that is the starting point document and having the corresponding display priority values that are smaller than a predetermined second set value are released.

11. A document display method to display a first electronic document and a second electronic document, the first electronic document having information related to the second electronic document, the method comprising:

determining a display priority based on a relevancy between each of the electronic documents;

displaying the first electronic document on a computer display;

overlaying an image on the first electronic document corresponding to the second electronic document at a predetermined position defined in the first electronic document;

resizing the first electronic document and the image corresponding to the second electronic document such that the first electronic document and the image of the second electronic document change sizes proportionally with respect to one another, said resizing being in response to user input or computer commands; and further displaying the resized first electronic document and overlaying the resized image corresponding to the second document on the computer display and maintaining relative positions between the first and second electronic documents in accordance with the predetermined position, wherein structure information of electronic documents of a linked document group having a link source that is a starting point document and having corresponding display priority values that are smaller than a predetermined first set value are not analyzed.

12. The document display method as set forth in claim 11 wherein:

said overlaying comprises further overlaying an image corresponding to a third electronic document on the first electronic document at a second predetermined position defined in the first electronic document;

said resizing comprises further resizing the image corresponding to the third electronic document proportionally with the resizing of the first and second electronic documents; and said further displaying comprises overlaying the resized image corresponding to the third electronic document on the first electronic document and maintaining relative positions between the first and third electronic documents in accordance with the second predetermined position of the third electronic document relative to the first electronic document.

13. A document display apparatus for displaying a first electronic document and a second electronic document, the first electronic document having information related to the second electronic document, the apparatus comprising:

means for determining a display priority of the first and second electronic document;

means for displaying the first electronic document on a computer display;

means for overlaying an image on the first electronic document corresponding to the second electronic document at a predetermined position defined in the first electronic document;

means for resizing the first electronic document and the image corresponding to the second electronic document in response to computer and/or user commands such that a size of the first electronic document and a size of the image of the second electronic document change proportionally with respect to one another; and means for further displaying the resized first electronic document and overlaying the resized image corresponding to the second document on the computer display and maintaining relative positions between the first and second electronic documents in accordance with the predetermined position; and wherein structure information of electronic documents of a linked document group having a link source that is a starting point document and having corresponding display priority values that are smaller than a predetermined first set value are not analyzed.

14. A document display apparatus to manage a plurality of electronic documents, a portion of which includes hyperlink information relating to linked documents having a display relevancy, comprising:

a structure analysis unit to determine a display priority of each of the electronic documents based on only the hyperlink information thereof;

a display unit to determine a display method of each of the electronic documents based on the determined display priority; and wherein structure information of electronic documents of a linked document group having a link source that is a starting point document and having corresponding display priority values that are smaller than a predetermined first set value are not analyzed.

15. The document display apparatus according to claim 14, further comprising:

a structure storage unit to store the determined display priority of each of the electronic documents.

16. A document display method of managing a plurality of electronic documents, a portion of which includes hyperlink information relating to linked documents having display relevancy, comprising:

determining a starting point document to use as a starting point when analyzing the hyperlink information of the plurality of electronic documents;

analyzing the hyperlink information of the starting point document and calculating a display priority of each document having a link source included in the starting point document;

specifying one or more display documents to display based on the display priority of each said document having the link source included in the starting point document;

specifying constituent documents constituting a document group structure by adding and storing the hyperlink information in the document group structure based on the display priority of the linked document having the link source that is the starting point document; and searching for a next electronic document that constitutes a next starting point document based on the document group structure, wherein, repeatedly performing the determining operation, the analyzing operation, the specifying operations and the searching operation; and terminating display scanning at a time when there are no longer any electronic documents that constitute the starting point document determined by the determining operation; and wherein structure information of electronic documents of a linked document group having a link source that is a starting point document and having corresponding display priority values that are smaller than a predetermined first set value are not analyzed.

17. A document display method of managing a plurality of electronic documents, a portion of which includes hyperlink information relating to linked documents having display relevancy, comprising:

determining a starting point document to use as a starting point;

analyzing the hyperlink information of the starting point document;

calculating a display priority of each document having a link source included in the starting point document according to the analyzed hyperlink information therein; and displaying one or more display documents based on the calculated display priority of each said document having the link source included in the starting point document; and wherein structure information of electronic documents of a linked document group having a link source that is a starting point document and having corresponding display priority values that are smaller than a predetermined first set value are not analyzed.

18. A document display apparatus for displaying a first electronic document and a second electronic document, the first electronic document having information related to the second electronic document, the apparatus comprising:

a display priority unit determining a display priority of the first and second electronic document;

a display unit displaying the first electronic document on a computer display;

an image overlaying unit overlaying an image on the first electronic document corresponding to the second electronic document at a predetermined position defined in the first electronic document; and resizing unit resizing the first electronic document and the image corresponding to the second electronic document in response to computer and/or user commands such that a size of the first electronic document and a size of the image of the second electronic document change proportionally with respect to one another, wherein the resized first electronic document is further displayed and the resized image corresponding to the second document is overlayed on the computer display and relative positions between the first and second electronic documents are maintained in accordance with the predetermined position, and wherein structure information of electronic documents of a linked document group having a link source that is a starting point document and having corresponding display priority values that are smaller than a predetermined first set value are not analyzed.

\* \* \* \* \*

UNITED STATES PATENT AND TRADEMARK OFFICE
CERTIFICATE OF CORRECTION

PATENT NO. : 6,877,135 B1
APPLICATION NO. : 09/473049
DATED : April 5, 2005
INVENTOR(S) : Toru Kamiwada et al.

It is certified that error appears in the above-identified patent and that said Letters Patent is hereby corrected as shown below:

Column 16, Line 52, after "group" insert -- , --.
Column 16, Line 61, after "document" insert -- , --.
Column 17, Line 1, after "apparatus" insert -- , --.
Column 17, Line 5, after "document" insert -- , --.
Column 17, Line 9, after "document" insert -- , --.
Column 17, Line 11, after "value" insert -- , --.
Column 18, Line 22, after "document" insert -- , --.
Column 18, Line 53, delete ":" and insert -- ; -- therefor.

Signed and Sealed this

Twenty-fifth Day of July, 2006

JON W. DUDAS
*Director of the United States Patent and Trademark Office*